(12) United States Patent
Bernardo et al.

(10) Patent No.: US 12,059,005 B2
(45) Date of Patent: Aug. 13, 2024

(54) MULTIPLE-FUNCTION BIOLOGICAL COMPOSITION

(71) Applicant: AGRIVALLE BRASIL INDÚSTRIA E COMÉRCIO DE PRODUTOS AGRÍCOLAS LTDA, Salto (BR)

(72) Inventors: Eduardo Roberto de Almeida Bernardo, Indaiatuba (BR); Thales Facanali Martins, Indaiatuba (BR)

(73) Assignee: AGRIVALLE BRASIL INDÚSTRIA E COMÉRCIO DE PRODUTOS AGRÍCOLAS LTDA, Salto (BR)

( * ) Notice: Subject to any disclaimer, the term of this patent is extended or adjusted under 35 U.S.C. 154(b) by 0 days.

(21) Appl. No.: 17/285,247

(22) PCT Filed: Oct. 23, 2019

(86) PCT No.: PCT/BR2019/050459
§ 371 (c)(1),
(2) Date: Apr. 14, 2021

(87) PCT Pub. No.: WO2020/082148
PCT Pub. Date: Apr. 30, 2020

(65) Prior Publication Data
US 2021/0368808 A1  Dec. 2, 2021

(30) Foreign Application Priority Data
Oct. 26, 2018 (BR) .......................... 102018072160-7

(51) Int. Cl.
| A01N 63/30 | (2020.01) |
| A01N 63/20 | (2020.01) |
| A01N 63/22 | (2020.01) |
| A01N 63/28 | (2020.01) |
| A01P 15/00 | (2006.01) |

(52) U.S. Cl.
CPC ............ *A01N 63/30* (2020.01); *A01N 63/20* (2020.01); *A01N 63/22* (2020.01); *A01N 63/28* (2020.01); *A01P 15/00* (2021.08)

(58) Field of Classification Search
CPC ........ A01N 63/20; A01N 63/22; A01N 63/28; A01N 63/30; A01P 15/00

USPC .......................................... 424/93.3
See application file for complete search history.

(56) References Cited

U.S. PATENT DOCUMENTS

| 5,545,801 A * | 8/1996 | Fulton ...................... B09C 1/00 |
| | | 210/195.1 |
| 9,795,143 B2 | 10/2017 | Escobar Valdes et al. |
| 10,104,896 B2 | 10/2018 | Benavides et al. |
| 2014/0228212 A1* | 8/2014 | Pedersen ................ A01N 63/20 |
| | | 424/93.3 |
| 2014/0328817 A1 | 11/2014 | Escobar Valdes et al. |
| 2015/0359229 A1 | 12/2015 | Benavides et al. |

FOREIGN PATENT DOCUMENTS

| WO | WO 2010/115802 | 10/2010 |
| WO | WO 2014/133378 | 9/2014 |

OTHER PUBLICATIONS

Torracchi et al., Fighting plant pathogens with cold-active microorganisms: biopesticide development and agriculture intensification in cold climates, Applied Microbiology and Biotechnology, vol. 104, (2020), pp. 8243-8256.*
International Search Report for PCT/BR2019/050459 dated Nov. 12, 2019.

* cited by examiner

*Primary Examiner* — Jennifer M. H. Tichy
(74) *Attorney, Agent, or Firm* — B. Aaron Schulman, Esq.; Stites & Harbison, PLLC

(57) ABSTRACT

Multiple-function biological compositions for the biological control of phytopathogens, phytonematodes and agricultural pests are provided for use as an inoculant, for phosphorus solubilization, for soil conditioning, for use as a biostimulant, for hydric stress reduction in cultivated plants and for bioremediation in agricultural or non-agricultural areas. The compositions contain mixtures of additives and excipients having at least two genera and/or species of Actinomycetes or other bacterial species, so as to provide nematicidal effects, fungicidal effects. insecticidal action in the reduction of damage and control of insects, and other properties such as growth-promotion and soil conditioning. The compositions may also be used, for use as a biostimulant, for hydric stress mitigation in cultivated plants, and for bioremediation in agricultural or non-agricultural areas.

12 Claims, No Drawings

MULTIPLE-FUNCTION BIOLOGICAL COMPOSITION

The present patent is directed to multifunction biological compositions for the biological control of phytopathogens, phytonematodes and plant pests, for use as an inoculant, as a phosphorus solubilizer, as a soil conditioner, as a biostimulant, as a crop hydric stress reducer, and for bioremediation in cultivable or non-cultivable areas, more particularly compositions comprising mixtures of additives and excipients having at least 2 (two) genera and/or species of Actinomycetes, Actinomycetes mixed with *Bacillus* genus representatives, Actinomycetes mixed with fungi of Hypocreales, Helotiales and Mucorales orders, and the combination among the whole or part thereof, with nematocidal effects on the reduction of damages and control of phytonematodes, with fungicidal effects on the reduction of damages and control, with an insecticidal action for reducing and controlling damages, with a growth promotion action, soil conditioning, biostimulation, in the mitigation of hydric stress of cultivated plants, and for bioremediation in cultivable or non-cultivable areas, in addition to chemical pesticides (or not), polymers/excipients in spray formulations, used in plantation furrow spraying, drench, coating (industrial or non-industrial), treatment (industrial or non-industrial) and incrustation (industrial or non-industrial) of crop seeds. Pertaining to the biotechnology technical sector, this composition increases the efficiency in the manipulation of cultivated plants by using mechanisms of action that are different and complementary to the compositions of the above micro-organisms.

STATE OF THE ART

In the present world agricultural scenario, the production gains have been many times associated to gradual productivity increases without an increase in the cultivable area. Said productivity increases have been attained through significant advancements in cultivation techniques, use of varieties more adapted to biotic and abiotic factors, suitability of plant nutritional requirement, and also by better controlling and reducing the damages caused by phytopathogenic agents and plant pests. Among said advancements, the control of pests and diseases is still considered to be the greatest challenge in keeping up with the crop productivity. A number of techniques can be used, with a higher or lower degree of efficacy, but generally the use of chemical pesticides has been the most used method.

However, for controlling phytopathogens, phytonematodes and plant pests, the use of chemical pesticides has shown many times unsatisfactory results. Most of this problem derives from the indiscriminate excessive use of chemical molecules which has often caused human and/or animal intoxication issues, concomitantly with the contamination of the environment. Such events have led to an increase in the public awareness of the use of chemical pesticides and a never-ending search for safer or alternate handling techniques.

Thus, alternative controls for phytonematodes, phytopathogens and plant pests have been used whenever possible, but adversities inherent to the biology of said organisms usually make it impossible to use some techniques. For example, varieties of resistant cultivars are seldom available, while the rotation of the plantation usually is not viable, in view of costs or the wide range of hosts for some species (Bird et al., 2003)

In this context, the biological control using micro-organisms has been deemed to be a viable option, either for treating seeds, treating plantation furrow or spraying cultivated plants of interest.

Actinomycetes comprise more than 30% of the population of soil micro-organisms (Kennedy, 1999). Said micro-organisms are metabolically distinct and able to create varied sources of energy, and can also be autotrophic, heterotrophic, chemotrophic or phototrophic (Kennedy, 1999). They play a crucial role on the decomposition of polluting organic compounds actives in nature (Groth et al., 1999). They are also active in the decomposition of organic matter in the soil, including lignin and other recalcitrant polymers, and they can degrade both agricultural and urban debris (Hauer, et al., 1997).

Actinomycetes are both qualitatively and quantitatively important in the rhizosphere. According to Crawford et al. (1993), they can influence the growth of plants and protect the roots from being invaded by phytopathogenic organisms, and can be used as biological control agents. They act as fungi, bacteria and phytonematodes antagonistic agents, or for producing fungicidal, bactericidal and nematocidal compounds. Pandhare et al. (2002), studied the production and alkaline protease inhibitors by *Streptomyces* sp. This is a quite important factor, since said proteins are essential for the life cycle of many phytopathogenic organisms, and thus They can be used in the biological control in plants.

Actinomycetes also produce Chemical compounds such as thiamine, riboflavin, vitamin B12, several porphyrins, iron containing compounds, and coenzymes which can promote or inhibit the growth of other organisms (Kennedy, 1999).

Such micro-organisms are important pesticide degrading agents. This degrading capacity is not bound by a genus or family. The main ones belong to genus of sub-orders: Micrococcineae (*Arthrobacter, Brevibacteriu, Clavibacter*), Corynebacterineae (*Corynebacterium, Nocardia, Rhodococcus*), Micromonosporineae (*Micromonospora*), Propionibacterineae (*Nocardioides*) and Strepetomycineae (*Streptomyces*). Said Actinomycetes can degrade several pesticides, such as organochlorinated, symmetric triazines, triazinones, carbamates, sulfonyl ureas and acetanilids. The degradation can take place when said compounds are used as the only source of carbon and energy through co-metabolism (Schrijver & Mot, 1999). In works conducted by Esposito et al. (1998), *Streptomyces* showed a good potential for bioremediation of soil contaminated with Diuron, one of the most used herbicides in Brazil, without generating secondary metabolites.

*Streptomyces* are able to produce large amounts of enzymes with several industrial possibilities. The main groups of enzymes are oxidoreductases, transferases, hydrolases, lyases, isomerases and synthases. In nature, they play an important role in the formation of humus, especially through the production of extracellular enzymes that can degrade cellulolytic compounds (Padilha, 1998). Further, they are important producers of antibiotics.

Members of genus *Frankia* fix nitrogen into non-leguminous plant nodules (Heuer et al., 1997). In view of that, they are important for the world nitrogen balance (Araújo, 1998).

*Nocardia* and *Rhodococcus* are important components of the soil microflora and are involved in the degradation of organic matter, and they can decompose highly environmentally harmful chemicals (Groth et al., 1999).

Among the mechanisms of action, antagonism and antibiosis are usually the predominant way bacteria act against phytonematodes and fungi. Besides the direct effect on the mortality of phytonematodes, said nematocides can act directly on the emergence of eggs or on the mobility, and indirect effects, such as radicular exudate alteration, confused locomotion or induction of resistance are also observed (Sikora & Hoffmann-Hergarten, 1992; Hasky-Günther et al. 1998). The use of bacteria as biological control agents has been shown to be a promising alternative in the productive system (Hallmann et al. 2004), such as, for example, for *Meloidogyne graminicola*, where *Bacillus megaterium* reduced the penetration and formation of branches of said phytonematode in rice roots by 40%, besides reducing its migration to the rhizosphere by 60% and reducing the emergence of eggs by 60% (Sikora & Padgham 2007).

According to Da Silva et al. (2007) the use of *Bacillus subtilis* for controlling *Pratylenchus brachyurus* was as good as the Chemical treatment using abamectin, exhibiting extremely low populations of said phytonematodes in the soil, about 1 phytonematode/cm$^3$ of soil, reducing 90% said population by 90% compared to the witness treatment. Other results in this line of research, also using *Bacillus subtilis* to treat seeds, is evidenced by Da Silva et al. (2007), showing that this handling alternative has provided reductions in the order of 50.06% of the population of *Pratylenchus* spp. 30 days after seeding, and the productivity increased 18%. Similar results have been attained by Higaki (2012) using *Bacillus subtilis* for controlling *Rotylenchulus reniformis* and *Pratylenchus brachyurus* in cotton plants. The treatment with the micro-organism resulted in reductions higher than 50% in the population of said phytonematodes in the crop roots.

Another interesting fact reported by Higaki (2012) was that the plants treated with said micro-organisms exhibited fresh mass increments in the roots and aerial portion in the order of 36 and 47%, respectively, compared to the witness treatment. According to Araújo et al. (2008), the mechanisms of action responsible for promoting plant growth can be initially connected to the direct inhibition of the pathogen and the induction of systemic resistance, among others. It is many times difficult to recognize the mechanisms and associate same with the direct promotion of growth, since more than one mechanism is produced by the bacteria.

For the biological control of phytopathogens cultivated plants, Cook & Baker (1983) have reported that the characterization of effectiveness of this handling practice is the "reduction of the inoculum sum or disease-determining activities caused by a pathogen, carried out by or through one or more organisms other than man." With this concept of action in mind, Bettiol et al. (2008) have reported that the use of *Bacillus subtilis* has succeeded well in the control of the oidium (caused by fungus *Uncinula necato*) and grey rottenness (caused by fungus *Botrytis cinerea*) in grapes and other cultivated plants several years ago in Chile. According to Mattos (2010), the use of the mixture of *B. subitilis* and *B. licheniformis* has provided significant reductions in the incidence of green mildew, caused by fungus *Penicillium digitatum*, in post-harvest "pear" type orange.

Genus *Bacillus* spp. is well-known as an excellent producer of antimicrobial compounds (Huang & Chang, 1975; Baker et al., 1983; Motomura & Hirooka, 1996) and the evidence of the production of phytopathogen inhibiting substances, produced by several isolates of *Bacillus* spp. isolates is especially important for understanding the mechanisms of action of said micro-organisms in the antagonism. In general, antagonistic bacteria, such as *B. subtilis*, act significantly through antibiosis and occasionally through parasitism and competition. Thus, the control of the disease can be effective due to the substances produced, but not only by the mass introduction of biocontrol agents (Arras & Arru, 1997). In general, micro-organisms that act through antibiosis have a wide spectrum of action, so that when fungi are inhibited the production of toxic substances is more effective than any other mechanism of action involved.

With relation to the abiotic stress, a viable alternative with significant results is the use of plant growth promoting rhizobacteria (PGPB). Several mechanisms associated to PGPB's that help plants to withstand the effects of the hydric stress have been described, among them: solubilization and fixation of nutrients, production of siderophores, production of plant hormones, production of volatile compounds, alteration in the morphology and architecture of roots, ACC deaminase activity, accumulation of osmolytes, action on the plant antioxidant system and production of exopolysaccharides (EPS) (ALAMI et al., 2000; ARORA et al., 2001; HUSSAIN et al., 2009; VURUKONDA et al., 2016).

Among the mechanisms described, the production of EPS by bacteria has been widely studied, however aiming at the industrial use, especially in food and drug industries, by virtue of their emulsifying and thickening characteristics (KUMAR et al., 2007). However, given said characteristics, the interest in the use of EPS producing bacteria in cultivated plants has grown, since they can act as an important tool in the mitigation of abiotic stress.

Despite said advantages, most of the existing products are based on the premise of exploring a single micro-organism for the biological control of phytopathogens and phytonematodes, for use as inoculants, soil conditioners, bioestimulants, crop hydric stress reducers, and for bioremediation. As reported, some agents have more than one mechanism of action, and they can act separately or simultaneously, direct or indirectly on phytonematodes and phytopathogens, stimulating plant growth, conditioning the soil, reducing the crop hydric stress, and for bioremediation. However, associations among several agents have not been fully explored and they expand the spectrum of action of said micro-organisms, favoring the plant growth and protection, and consequently increasing the productivity without harming the environment.

OBJECTS OF THE INVENTION

Therefore, the object of the present invention is to provide effective compositions for reducing damages caused by phytopathogens, phytonematodes and plant pests, promote the plant growth, condition soils, and mitigate damages caused by eventual hydric stress or environment contamination due to spraying, plantation furrow spraying, drench, coating (industrial or non-industrial), treatment (industrial or non-industrial) and incrustation (industrial or non-industrial) of seeds in addition to polymers/excipients to apply to cultivated plants including, but not limited to, *Coffea* spp (*Coffea arabica, Coffea canefora, Coffea robusta*), *Brachiaria* spp. (*Brachiaria brizantha, Brachiaria decumbens, Brachiaria humidicola, Brachiaria mutica, Brachiaria ruziziensis, Brachiaria arrecta, Brachiaria dictyneura*), *Panicum* spp. (*Panicum maximum*), *Sorghum* spp., *Pennisetum americanum, Glycine max, Zea mays, Gossypium hirsutum*, greenery (*Solanum lycopersicum, Allium cepa, Lactuca sativa, Daucus carota, Capsicum annuum* Group), forestry (*Eucalyptus* spp., *Tectona grandis, Hevea brasiliensis, Pinus* sp.), *Nicotiana tabacum*, ornamental, fruit (*Citrus* spp., *Malus* spp., *Carica papaya, Vitis* spp., *Cucumis melo, Prunus persica, Passiflora edulis*), crotalarias (*Crotalaria*

*juncea, Crotalaria spectabilis, Crotalaria ochroleuca, Crotalaria paulina, Crotalaria breviflora*), among others.

BRIEF DESCRIPTION OF THE INVENTION

The present invention refers to multifunction biological compositions for spraying, plantation furrow spraying, drench, coating (industrial or non-industrial), treatment (industrial or non-industrial) and incrustation (industrial or non-industrial) of crop seeds, comprising mixtures of at least 2 (two) genera and/or species of Actinomycetes or mutants thereof, Actinomycetes mixed with *Bacillus* or mutants thereof, Actinomycetes mixed with fungi or mutants thereof, and combinations among the whole or part thereof, concomitantly with chemical pesticides (or not), additives and excipients, in biological compositions having fungicidal, nematocidal, insecticidal properties, growth stimulation, soil conditioning and crop hydric stress reduction, and for bioremediation in cultivable areas.

DETAILED DESCRIPTION OF THE INVENTION

The multifunction biological compositions comprise: 1.0 to 20.0% (w/v) of at least 2 (two) genera and/or species of: Actinomycetes and mutants thereof; Actinomycetes mixed with *Bacillus* genus representatives; Actinomycetes mixed with fungi of Hypocreales, Orbiliales, Helotiales and Mucorales orders, and combinations among the whole or part thereof (in colony forming unities, c.f.u.);
  1.0 to 20.0% of additives;
  1.0 to 97.0% of excipients; and
  5.0 to 10.0% of chemical pesticides.

Actinomycetes and mutants thereof belong to the group consisting of *Streptomyces* spp., *Artrobacter* spp., *Brevibacterium* spp., *Clavibacter* spp., *Corynebacterium* spp., *Nocardia* spp, *Rhodococcus* spp., *Micromonospora* spp, *Nocardioides* spp. and *Frankia* spp.

Actinomycetes mixed with *Bacillus* genus representatives belong to the group consisting species: *Bacillus agri, Bacillus aizawai, Bacillus albolactis, Bacillus firmus, Bacillus coagulans, Bacillus endoparasiticus, Bacillus endorhythmos, Bacillus kustaki, Bacillus lacticola, Bacillus lactimorbus, Bacillus lactis, Bacillus laterosporus, Bacillus lentimorbus, Bacillus megaterium, Bacillus medusa, Bacillus metiens, Bacillus natto, Bacillus nigrificans, Bacillus popilliae, pumilus, Bacillus siamensis, Bacillus subtilis, Bacilus licheniformis, Bacillus amyloliquefasciens, Bacillus megaterium, Bacillus sphaericus, Bacillus thuringiensis.*

Actinomycetes mixed with fungi of order Hypocreales belong to the group consisting of species: *Trichoderma amazonicum, Trichoderma asperellum, Trichoderma atroviride, Trichoderma aureoviride, Trichoderma austrokoningii, Trichoderma brevicompactum, Trichoderma cinnamomeum, Trichoderma hamatum, Trichoderma harzianum, Trichoderma koningii, Trichoderma longibrachiatum, Trichoderma polysporum, Trichoderma pseudokoningii, Trichoderma reesei, Trichoderma stromaticum, Trichoderma vixens, Trichoderma viride, Trichoderma viridescens, Clonostachys agarwalii, Clonostachys asymmetrica, Clonostachys aurantia, Clonostachys chlorina, Clonostachys compacta, Clonostachys cylindrospora, Clonostachys farinosa, Clonostachys pseudobotrytis, Clonostachys pulvinata, Clonostachys rosea*, (Link) *Schroers, Clonostachys spectabilis, Clonostachys theobromae, Purpuriocillium lilacinus, Pochonia bulbillosa, Pochonia chlamydosporia, Pochonia chlamydosporia* var. *catenulata, Pochonia globispora, Pochonia goniodes, Pochonia humicola, Pochonia microbactrospora, Pochonia parasitica, Pochonia rubescens, Pochonia suchlasporia.*

Actinomycetes mixed with Orbiliales belong to the group consisting of species: *Arthrobotrys oligospora, Arthrobotrys aggregata, Arthrobotrys alaskana, Arthrobotrys amerospora, Arthrobotrys botryospora, Arthrobotrys brochopaga, Arthrobotrys conoides, Arthrobotrys constringens, Arthrobotrys cylindrospora, Arthrobotrys dactyloides, Arthrobotrys elegans Arthrobotrys ellipsospora, Arthrobotrys entomopaga, Arthrobotrys globospora, Arthrobotrys irregulares, Arthrobotrys javanica, Arthrobotrys longispora, Arthrobotrys musiformis, Arthrobotrys nematopaga, Arthrobotrys oligospora.*

Actinomycetes mixed with Helotiales belong to the group consisting of species: *Monacrosporium robustum, Monacrosporium appendiculatum, Monacrosporium elhpsosporum Monacrosporium eudermatum, Monacrosporium fusiforme, Monacrosporium globosporum, Monacrosporium leptosporum.*

Actinomycetes mixed with Mucorales belong to the group consisting of species *Cunninghamella elegans.*

Additives are dispersants selected from the group consisting of water-soluble ionic polymers, water-soluble anionic polymers, surfactants selected from the group consisting of anionic surfactants and non-anionic surfactants, and combinations thereof.

Excipients belong to the group consisting of: silicas, talc, bentonite, carbohydrates, carbonates, casein, milk whey and milk derivatives, and combinations thereof.

The pesticides consist of:
  a) Insecticides—capsaicin, cartap, celastrus-extract, chlorantraniliprole, chlorbenzuron, chlorethoxyfos, chlorfluazuron, chlorpyrifos-e, cnidiadin, cryolite, cyanophos, cyantraniliprole, cyclaniliprole, cyhalothrin, cyhexatin, cypermethrin, dacnusa, DCIP, dichloropropene, dicofol, diglyphus, diglyphus+dacnusa, dimethacarb, dithioether, dodecylacetate, emamectin, encarsia, EPN, eretmocerus, ethylene-dibromide, eucalyptol, fatty-acids, fatty-acids/salts, fenazaquin, fenobucarb (BPMC), fen pyroximate, flubrocythrinate, flufenzine, formetanate, formothion, furathiocarb, gamma-cyhalothrin, garlic-juice, granulosis-virus, harmonia, heliothis armigera NPV, inactive bacterium, indol-3-ylbutyric acid, iodomethane, iron, isocarbofos, isofenphos, isofenphos-m, isoprocarb, isothioate, kaolin, lindane, liuyangmycin, matrine, mephosfolan, metaldehyde, metarhizium-anisopliae, methamidophos, metolcarb (MTMC), mineral-oil, mirex, m-isothiocyanate, monosultap, myrothecium verrucaria, naled, neochrysocharis formosa, nicotine, nicotinoids, oil, oleic-acid, ometrhoate, orius, oxymatrine, paecilomyces, paraffin-oil, parathion-e, pasteuria, petroleum-oil, pheromones, phosphorus-acid, photorhabdus, phoxim, phytoseiulus, pirimiphos-e, plant-oil, *Plutella xylostella* GV, polyhedrosisvirus, polyphenol-extracts, potassium-oleate, profenofos, prosuler, prothiofos, pyraclofos, pyrethrins, pyridaphenthion, pyrimidifen, pyriproxifen, quillay-extract, quinomethionate, rape-oil, rotenone, saponin, saponozit, sodium-compounds, sodium-fluosilicate, starch, steinernema, *streptomyces*, sulfluramid, sulphur, tebupirimfos, tefluthrin, temephos, tetradifon, thiofanox, thiometon, triazamate, trichoderma, trichogramma, triflumuron, vertrine, kappa-bifenthrin, kappa-tefluthrin, dichoromezotiaz, broflanilide, pyraziflumid aldicarb, alanycarb, benfuracarb, carbaryl, carbofuran, carbosulfan, methiocarb, methomyl, oxamyl, pirimicarb, propoxur and thiodicarb, acephate, azinphos-ethyl, azinphos-methyl, chlorfenvinphos, chlorpyrifos, chlorpyrifos-methyl, demeton-Smethyl, diazinon, dichlorvos/DDVP, dicrotophos, dimethoate, disulfoton, ethion, fenitrothion, fenthion, isoxathion, malathion, methamidaphos, methidathion, mevinphos, monocrotophos, oxymethoate, oxydemeton-methyl, parathion, parathion-methyl, phenthoate, phorate, phosalone, phosmet, phosphamidon, pirimiphos-methyl, quinalphos, terbufos, tetrachlorvinphos, triazophos, trichlorfon, endosulfan, ethiprole, fipronil, pyrafluprole, pyriprole, acetamiprid, clothianidin, dinotefuran, imidacloprid, nitenpyram, thiacloprid, thiamethoxam, spinosad, spinetoram, mectins, abamectin, emamectin benzoate, ivermectin, lepimectin, milbemectin, hydroprene, kinoprene, methoprene, fenoxycarb, pyriproxyfen; pymetrozine, flonicamid, pyrifluquinazon, clofentezine, hexythiazox, etoxazole, diafenthiuron, fenbutatin oxide, propargite, chlorfenapyr, bensultap, cartap hydrochloride, thiocydam, thiosultap sodium, bistrifluron, diflubenzuron, flufenoxuron, hexaflumuron, lufenuron, novaluron, teflubenzuron, buprofezin, cyromazine, methoxyfenozide, tebufenozide, halofenozide, chromafenozide, amitraz, pyridaben, tebufenpyrad, tolfenpyrad, flufenerim, cyenopyrafen, cyflumetofen, hydramethylnon, acequinocyl, fluacrypyrim, indoxacarb, metaflumizone, spirodiclofen, spiromesifen, spirotetramat, flubendiamide, chlorantraniliprole, cyclaniliprole, cyantraniliprole, azadirachtin, amidoflumet, bifenazate, fluensulfone, piperonyl butoxide, pyridalyl, sulfoxaflor, acrinathrin, allethrin, bifenthrin, cyfluthrin, lambda-cyhalothrin, cypermethrin, alpha-cypermethrin, beta-cypermethrin, zeta-cypermethrin, deltamethrin, esfenvalerate, etofenprox, fenpropathrin, fenvalerate, flucythrinate, tau-fluvalinate, permethrin, silafluofen and tralomethrin, among others;

b) Fungicides: benzovindiflupyr, antiperonosporic, ametoctradin, amisulbrom, copper hydroxide, copper oxychloride, copper sulfate, copper persulfate, boscalid, thiflumazide, flutianil, furalaxyl, thiabendazole, benodanil, mepronil, isofetamid, fenfuram, bixafen, fluxapyroxad, penflufen, sedaxane, coumoxystrobin, enoxastrobin, flufenoxystrobin, pyraxystrobin, pyrametostrobin, triclopyricarb, fenaminstrobin, metominostrobin, pyribencarb, meptyldinocap, fentin acetate, fentin chloride, fentin hydroxide, oxytetracycline, chlozolinate, chloroneb, tecnazene, etridiazole, iodocarb, prothiocarb, extract from *Melaleuca alternifolia*, pyrisoxazole, oxpoconazole, etaconazole, fenpyrazamine, fenpicoxamide, mefentrifluconazole, naftifine, terbinafine, validamycin, pyrimorph, valifenalate, fthalide, probenazole, isotianil, laminarin, teclofthalam, triazoxide, pyriofenone, chlorothalonil, fluoroimide, bitertanol, bromuconazole, cyproconazole, difenoconazole, diniconazole, enilconazole, epoxiconazole, fluquinconazole, fenbuconazole, flusilazole, flutriafol, hexaconazole, imibenconazole, ipconazole, metconazole, myclobutanil, penconazole, propiconazole, prothioconazole, simeconazole, triadimefon, triadimenol, tebuconazole, tetraconazole, triticonazole, prochloraz, pefurazoate, imazalil, triflumizole, cyazofamid, benomyl, carbendazim, thiabendazole, fuberidazole, ethaboxam, etridiazole and hymexazole, azaconazole, diniconazole-M, oxpoconazol, paclobutrazol, uniconazol, 1-(4-chloro-phenyl)-2-([1,2,4]triazol-lyl)-cycloheptanol, imazalilsulfphate, azoxystrobin, dimoxystrobin, enestroburin, fluoxastrobin, kresoxim-methyl, methominostrobin, orysastrobin, picoxystrobin, pyraclostrobin, trifloxystrobin, enestroburin, methyl (2-chloro-5-[1-(3-methylbenzyloxyimino)ethyl]benzyl)carbamate, methyl (2-chloro-5-[1-(6-methylpyridin-2-ylmethoxyimino)ethyl]benzyl)carbamate, methyl 2-(ortho-(2,5-dimethylphenyloxymethylene)-phenyl)-3-methoxyacrylate, 2-(2-(6-(3-chloro-2-methyl-phenoxy)-5-fluoro-pyrimidin-4-yloxy)-phenyl)-2-methoxyimino-N-methyl-acetamide, 3-methoxy-2-(2-(N-(4-methoxy-phenyl)-cyclopropanecarboximidoyl sulfanylmethyl)-phenyl)-acrylic acid methyl ester; carboxin, benalaxyl, benalaxyl-M, fenhexamid, flutolanil, furametpyr, mepronil, metalaxyl, mefenoxam, ofurace, oxadixyl, oxycarboxin, penthiopyrad, isopyrazam, thifluzamide, tiadinil, 3,4-dichloro-N-(2-cyanophenyl)isothiazole-5-carboxamide, dimethomorph, flumorph, flumetover, fluopicolide (picobenzamid), zoxamide, carpropamid, diclocymet, mandipropamid, N-(2-(4-[3-(4-chlorophenyl)prop-2-ynyl oxy]-3-methoxyphenypethyl)-2-methanesulfonyl-amino-3-methylbutyramide, N-(2-(4-[3-(4-chloro-phenyl)prop-2-ynyloxy]-3-methoxy-phenyl)ethyl)-2-ethanesulfonylamino-3-methylbutyramide, methyl 3-(4-chlorophenyl)-3-(2-isopropoxycarbonylamino-3-methyl-butyrylamino)propionate, N-(4'-bromobiphenyl-2-yl)-4-difluoromethyl-2-methylthiazole-5-carboxamide, N-(4'-trifluoromethyl-biphenyl-2-yl)-4-difluoromethyl-2-methylthiazole-5-carboxamide, N-(4'-chloro-3'-fluorobiphenyl-2-yl)-4-difluoromethyl-2-methylthiazole-5-carboxamide, N-(3',4'-dichloro-4-fluorobiphenyl-2-yl)-3-difluoro-methyl-1-methylpyrazole-4-carboxamide, N-(3',4'-dichloro-5-fluorobiphenyl-2-yl)-3-difluoromethyl-lmethylpyrazole-4-carboxamide, N-(2-cyano-phenyl)-3,4-dichloroisothiazole-5-carboxamide, 2-amino-4-methyl-thiazole-5-carboxanilide, 2-chloro-N-(1,1,3-trimethyl-indan-4-yl)-nicotinamide, N-(2-(1,3-dimethylbutyl)-phenyl)-1,3-dimethyl-5-fluoro-1H-pyrazole-4-carboxamide, N-(4'-chloro3',5-difluoro-biphenyl-2-yl)-3-difluoromethyl-1-methyl-1H-pyrazole-4-carboxamide, N-(4'-chloro3',5-difluoro-biphenyl-2-yl)-3-trifluoromethyl-1-methyl-1H-pyrazole-4-carboxamide, N-(3',4'-dichloro-5-fluoro-biphenyl-2-yl)-3-trifluoromethyl-1-methyl-1H-pyrazole-4-carboxamide, N-(3',5 difluoro-4'-methyl-biphenyl-2-yl)-3-difluoromethyl-1-methyl-1H-pyrazole-4-carboxamide, N-(3',5-difluoro-4'-methyl-biphenyl-2-yl)-3-trifluoromethyl-1-methyl-1H-pyrazole-4-carboxamide, N-(cis-2-bicyclopropyl-2-yl-phenyl)-3-difluoromethyl-1-methyl-1H-pyrazole-4-carboxamide, N-(trans-2-bicyclopropyl-2-yl-phenyl)-3-difluoromethyl-1-methyl-1H-pyrazole-4-carboxamide, fluopyram, N-(3-ethyl-3,5-5-trimethyl-cyclohexyl)-3-formylamino-2-hydroxy-benzamide, oxytetracyclin, silthiofam, N-(6-methoxy-pyridin-3-yl) cyclopropanecarboxamide, 2-iodo-N-phenylbenzamide, N-(2-bicyclo-propyl-2-yl-phenyl)-3-difluormethyl-1-methylpyrazol-4-ylcarb oxamide, N-(3',4',5'-trifluorobiphenyl-2-yl)-1,3-dimethylpyrazol-4-ylcarboxamide, N-(3',4',5'-trifluorobiphenyl-2-yl)-1,3-dimethyl-5-fluoropyrazol-4-yl-carboxamide, N-(3',4',5'-trifluorobiphenyl-2-yl)-5-chloro1,3-dimethyl-pyrazol-4-ylcarboxamide, N-(3',4',5'-trifluorobiphenyl-2-yl)-3-fluoromethyl-lmethylpyrazol-4-ylcarboxamide, N-(3',4',5'-trifluorobiphenyl-2-yl)-3-(chlorofluoromethyl)-lmethylpyrazol-4-ylcarboxamide, N-(3',4', 5'-trifluorobiphenyl-2-yl)-3-difluoromethyl-lmethylpyrazol-4-ylcarboxamide, N-(3',4',5'-trifluorobiphenyl-2-yl)-3-difluoromethyl-5-fluoro-1methylpyrazol-4-ylcarboxamide, N-(3',4',5'-trifluorobiphenyl-2-yl)-5-chloro-3-difluoromethyl-1-methylpyrazol-4-ylcarboxamide, N-(3',4',5'-trifluorobiphenyl-2-yl)-3-(chlorodifluoromethyl)-1methylpyrazol-4-ylcarboxamide, N-(3',4',5'-trifluorobiphenyl-2-yl)-1-methyl-3-trifluoromethylpyrazol-4-ylcarboxamide, N-(3',4',5'-trifluorobiphenyl-2-yl)-5-fluoro-1-methyl-3-trifluoromethylpyrazol-4-ylcarboxamide, N-(3',4',5'-tri fluorobiphenyl-2-yl)-5-chloro-1-methyl-3-trifluoromethylpyrazol-4-ylcarboxamide, N-(2',4',5'-trifluorobiphenyl-2-yl)-1,3-dimethylpyrazol-4-ylcarboxamide, N-(2',4',5'-trifluorobiphenyl-2-yl)-1,3-dimethyl-5-fluoropyrazol-4-ylcarboxamide, N-(2,4,5'-trifluorobiphenyl-2-yl)-5-chloro-1,3-dimethylpyrazol-4-ylcarboxamide, N-(2',4',5'-trifluorobiphenyl-2-yl)-3-fluoromethyl-1-methylpyrazol-4-ylcarboxamide, N-(2',4',5'-trifluorobiphenyl-2-yl)-3-(chlorofluoromethyl)-1-methylpyrazol-4-ylcarboxamide, N-(2',4',5'-trifluoro- biphenyl-2-yl)-3-difluoromethyl-1-methylpyrazol-4-ylcarboxamide, N-(2',4',5'-trifluorobiphenyl-2-yl)-3-difluoromethyl-5-fluoro-1-methylpyrazol-4-ylcarboxamide, N-(2',4',5'-trifluorobiphenyl-2-yl)-5-chloro-3-difluoromethyl-1-methylpyrazol-4-ylcarboxamide, N-(2',4',5'-trifluorobiphenyl-2-yl)-3-(chlorodifluoromethyl)-1-methylpyrazol-4-ylcarboxamide, N-(2',4',5'-trifluorobiphenyl-2-yl)-1-methyl-3-trifluoromethylpyrazol-4-ylcarboxamide, N-(2',4',5'-trifluorobiphenyl-2-yl)-5-fluoro-1-methyl-3-trifluoromethylpyrazol-4-ylcarboxamide, N-(2',4',5'-trifluorobiphenyl-2-yl)-5-chloro-1-methyl-3-trifluoromethylpyrazol-4-ylcarboxamide, N-(3',4'-dichloro-3-fluorobiphenyl-2-yl)-1-methyl-3-trifluoromethyl-1H-pyrazole-4-carboxamide, N-(3',4'-dichloro-3-fluorobiphenyl-2-yl)-1-methyl-3-difluoromethyl-1H-pyrazole-4-carboxamide, N-(3',4'-difluoro-3-fluorobiphenyl-2-yl)-1-methyl-3-trifluoromethyl-1H-pyrazole-4-carboxamide, N-(3',4'-difluoro-3-fluorobiphenyl-2-yl)-1-methyl-S-difluoromethyl-1H-pyrazole-4-carboxamide, N-(3'-chloro-4'-fluoro-3-fluorobiphenyl-2-yl)-1-methyl-3-difluoromethyl-1H-pyrazole-4-carboxamide, N-(3',4'-dichloro-4-fluorobiphenyl-2-yl)-1-methyl-3-trifluoromethyl-1H-pyrazole-4-carboxamide, N-(3',4'-difluoro-4-fluorobiphenyl-2-yl)-1-methyl-S-trifluoromethyl-1H-pyrazole-4-carboxamide, N-(3',4'-dichloro-4-fluorobiphenyl-2-yl)-1-methyl-3-difluoromethyl-1H-pyrazole-4-carboxamide, N-(3',4'-difluoro-4-fluorobiphenyl-2-yl)-1-methyl-3-difluoromethyl-1H-pyrazole-4-carboxamide, N-(3'-chloro-4'-fluoro-4-fluorobiphenyl-2-yl)-1-methyl-5-difluoromethyl-1H-pyrazole-4-carboxamide, N-(3',4'-dichloro-5-fluorobiphenyl-2-yl)-1-methyl-3-trifluoromethyl-1H-pyrazole-4-carboxamide, N-(3',4'-difluoro-5-fluorobiphenyl-2-yl)-1-methyl-3-trifluoromethyl-1H-pyrazole-4-carboxamide, N-(3',4'-dichloro-5-fluorobiphenyl-2-yl)-1-methyl-S-difluoromethyl-1H-pyrazole-carboxamide, N-(3',4'-difluoro-5-fluorobiphenyl-2-yl)-1-methyl-3-difluoromethyl-1H-pyrazole-4-carboxamide, N-(3',4'-dichloro-5-fluorobiphenyl-2-yl)-1,3-dimethyl-1H-pyrazole-4-carboxamide, N-(3'-chloro-4'-fluoro-5-fluorobiphenyl-2-yl)-1-methyl-3-difluoromethyl-1H-pyrazole-4-carboxamide, N-(4'-fluoro-4-fluorobiphenyl-2-yl)-1-methyl-3-trifluoromethyl-1H-pyrazole-4-carboxamide, N-(4'-fluoro-5-fluorobiphenyl-2-yl)-1-methyl-3-trifluoromethyl-1H-pyrazole-4-carboxamide, N-(4'-chloro-5-fluorobiphenyl-2-yl)-1-methyl-3-trifluoromethyl-1H-pyrazole-4-carboxamide, N-(4'-methyl-5-fluorobiphenyl-2-yl)-1-methyl-3-trifluoromethyl-1H-pyrazole-4-carboxamide, N-(4'-fluoro-5-fluorobiphenyl-2-yl)-1,3-dimethyl-1H-pyrazole-4-carboxamide, N-(4'-chloro-5-fluorobiphenyl-2-yl)-1,3-dimethyl-1H-pyrazole-4-carboxamide, N-(4'-methyl-5-fluorobiphenyl-2-yl)-1,3-dimethyl-1H-pyrazole-4-carboxamide, N-(4'-fluoro-6-fluorobiphenyl-2-yl)-1-methyl-3-trifluoromethyl-1H-pyrazole-4-carboxamide, N-(4'-chloro-6-fluorobiphenyl-2-yl)-1-methyl-3-trifluoromethyl-1H-pyrazole-4-carboxamide, N-[2-(1,1,2,3,3,3-hexafluoropropoxy)-phenyl]-3-difluoromethyl-1-methyl-1H-pyrazole-4-carboxamide, N-[4'-(trifluoromethylthio)-biphenyl-2-yl]-3-difluoromethyl-1-methyl-1H-pyrazole-4-carboxamide and N-[4'-(trifluoromethylthio)-biphenyl2-yl]-1-methyl-3-tri fluoromethyl-1-methyl-1H-pyrazole-4-carboxamide, fluazinam, pyrifenox, bupirimate, cyprodinil, fenarimol, ferimzone, mepanipyrim, nuarimol, pyrimethanil, triforine, fenpiclonil, fludioxonil, aldimorph, dodemorph, fenpropimorph, tridemorph, fenpropidin, iprodione, procymidone, vinclozolin, famoxadone, fenamidone, octhilinone, probenazole, 5-chloro-7-(4-methyl-piperidin-1-yl)-6-(2,4,6-trifluorophenyl)-[1,2,4]triazolo[1,5-a]pyrimidine, anilazine, diclomezine, pyroquilon, proquinazid, tricyclazole, 2-butoxy-6-iodo-3-propylchromen-4-one, acibenzolar-S-methyl, captafol, captan, dazomet, folpet, fenoxanil, quinoxyfen, N,N-dimethyl-3-(3-bromo-6-fluoro-2-methylindole-1sulfonyl)-[1,2,4]triazole-1-sulfonamide, 5-ethyl-6-octyl-[1,2,4]triazolo[1,5-a]pyrimidin-2,7-diamine, 2,3,5,6-tetrachloro-4-methane sulfonyl-pyridine, 3,4, 5-trichloro-pyri dine-2,6-di-carbonitrile, N-(1-(5-bromo-3-chloro-pyri din-2-yl)-ethyl)-2,4-dichloro-nicotinamide, N-((5-bromo-3-chloropyri din-2-yl)-methyl)-2,4-dichloro-nicotinamide, diflumetorim, nitrapyrin, dodemorphacetate, fluoroimid, blasticidin-S, chinomethionat, debacarb, difenzoquat, difenzoquat-methylsulphat, oxolinic acid, piperalin, mancozeb, maneb, metam, methasulphocarb, metiram, ferbam, propineb, thiram, zineb, ziram, diethofencarb, iprovalicarb, benthiavalicarb, propamocarb, propamocarb hydrochlorid, 4-fluorophenyl N-(1-(1-(4-cyanophenyl)-ethanesulfonyl)but-2-yl)carbamate, methyl 3-(4-chloro-phenyl)-3-(2-isopropoxycarbonylamino-3-methylbutyrylamino)propanoate, guanidine, iminoctadine, guazatine, kasugamycin, oxytetracyclin, streptomycin, polyoxin, validamycin, binapacryl, dinocap, dinobuton, sulfur-containing heterocyclyl compounds: dithianon, isoprothiolane, edifenphos, iprobenfos, fosetyl, fosetyl-aluminum, pyrazophos, tolclofos-methyl, dichlofluanid, flusulfamide, hexachlorobenzene, phthalide, pencycuron, quintozene, thiophanate, thiophanatemethyl, cyflufenamid, cymoxanil, dimethirimol, ethirimol, furalaxyl, metrafenone and spiroxamine, guazatine-acetate, iminoc-tadine-triacetate, iminoctadinetris(albesilate), kasugamycin hydrochloride hydrate, dichlorophen, pentachlorophenol and its salts, N-(4-chloro-2-nitro-phenyl)-N-ethyl-4-methyl-benzenesulfonamide, dicloran, nitrothal-isopropyl, tecnazen, biphenyl, bronopol, diphenylamine, mildiomycin, oxincopper, prohexadione calcium, N-(cycl opropylmethoxyimino-(6-difluoromethoxy-2,3-difluoro-phenyl)-methyl)-2-phacetamide, N'-(4-(4-chloro-3-trifluoromethyl-phenoxy)-2,5-dimethyl-phenyl)-N-ethyl-N-methyl formamidine, N'-(4-(4-fluoro- 3-trifluoromethyl-phenoxy)-2,5-dimethyl-phenyl)-N-ethyl-N-methyl formamidine, N'-(2-methyl-5-trifluormethyl-4-(3-trimethylsilanyl-propoxy)-phenyl)-N-ethyl-Nmethylformamidine and N'-(5-difluormethyl-2-methyl-4-(3-trimethylsilanyl-propoxy)-phenyl)-Nethyl-N-methyl formamidine;

c) Herbicides: alloxydim, clethodim, cloproxydim, cycloxydim, sethoxydim, tralkoxydim, butroxydim, clefoxydim, tepraloxydim; phenoxyphenoxypropionic esters, clodinafop-propargyl, cyhalofop-butyl, diclofop-methyl, fenoxa prop-ethyl, fenoxaprop-P-ethyl, fenthiapropethyl, fluazifop-butyl, fluazifop-P-butyl, haloxyfop-ethoxyethyl, haloxyfop-methyl, haloxyfop-P-methyl, isoxapyrifop, propaquizafop, quizalofop-ethyl, quizalofop-P-ethylorquizalofop-tefuryl, flamprop-methyl, flamprop-isopropyl, imazapyr, imazaquin, imazamethabenz-methyl (imazame), imazamox, imazapic, imazethapyr, pyrithiobac-acid, pyrithiobac-sodium, bispyribac-sodium, pyribenzoxym, florasulam, flumetsulam, metosulam, amidosulfuron, azimsulfuron, bensulfuron-methyl, chlorimuron-ethyl, chlorsulfuron, cinosulfuron, cyclosulfamuron, ethametsulfuron-methyl, ethoxysulfuron, flazasulfuron, halosulfuron-methyl, imazosulfuron, metsulfuron-methyl, nicosulfuron, primisulfuron-methyl, prosulfuron, pyrazosulfuron-ethyl, rimsulfuron, sulfometuron-methyl, thifensulfuron-methyl, triasulfuron, tribenuron-methyl, triflusulfuron-methyl, tritosulfuron, sulfosulfuron, foramsulfuron, iodosulfuron, benzoyl prop-ethyl, bromobutide, chiorthiamid, diphenamid, etobenzanidibenzchlomet, fluthiamide, fosamin, monalide, clopyralid, picloram, 2,4-D, benazolin, naptalame, diflufenzopyr, benzofenap, clomazone, diflufenican, fluorochloridone, fluridone, pyrazolynate, pyrazoxyfen, isoxaflutole, isoxachlortole, mesotrione, sulcotrione, ketospiradox, flurtamone, norflurazon, amitrol, glyphosate, sulfosate, bilanafos, glufosinateammonium, anilofos, mefenacet, dimethenamid, S-dimethenamid, acetochlor, alachlor, butachlor, butenachlor, diethatyl-ethyl, dimethachlor, metazachlor, metolachlor, S-metolachlor, pretilachlor, propachlor, prynachlor, terbuchlor, thenylchlor, xylachlor, butylate, cycloate, di-allate, dimepiperate, EPTC. esprocarb, molinate, pebulate, prosulfocarb, thiobencarb, tri-allate, vemolate; benfuresate, perfluidone; asulam, carbetamid, chlorpropham, orbencarb, pronamid, propham, tiocarbazil benefin, butralin, dinitramin, ethalfluralin, fluchloralin, oryzalin, pendimethalin, prodiamine, trifluralin dithiopyr, thiazopyr, butamifos, chlorthal-dimethyl (DCPA), acifluorfen, acifluorfen-sodium, aclonifen, bifenox, chlomitrofen (CNP), ethoxyfen, fluorodifen, fluoroglycof enethyl, fomesafen, furyloxyfen, lactofen, nitrofen, nitrofluorfen or oxyfluorfen, oxadiargyl, oxadiazon, azafenidin, butafenacil, carfentrazone-ethyl, cinidon-ethyl, flumiclorac-pentyl, flumioxazin, flumipropyn, flupropacil, fluthiacet-methyl, sulfentrazone, thidiazimin, nipyraclofen, propanil, pyridate or pyridafol, bromofenoxim, dinoseb, dinoseb-acetate, dinoterb, cyperquat-chloride, difenzoquat-methylsulfate, diquat or paraquatdichloride, chlorbromuron, chlorotoluron, difenoxuron, dimefuron, diuron, ethidimuron, fenuron, fluometuron, isoproturon, isouron, linuron, methabenzthiazuron, methazole, metobenzuron, metoxuron, monolinuron, neburon, siduron, tebuthiuron, bromoxynil, ioxynil, chloridazon, ametryn, atrazine, cyanazine, desmein, dimethamethryn, hexazinone, prometon, prometryn, propazine, simazine, simetryn, terbumeton, terbutryn, terbutylazine, trietazine, metamitron, metribuzin bromacil, lenacil, terbacil, desmedipham, phenmedipham, tridiphane, isoxaben, dichlobenil, dalapon, ethofumesate, chlorfenac, aziprotryn, barban, bensulide, benzthiazuron, benzofluor, buminafos, buthidazole, buturon, cafenstrole, chlorbufam, chlorfenprop-methyl, chloroxuron, cinmethylin, cumyluron, cycluron, cyprazine, cyprazole, dibenzyluron, dipropetryn, dyrnron, eglinazin-ethyl, endothall, ethiozin, flucabazone, fluorbentranil, flupoxam, isocarbamid, isopropalin, karbutilate, mefluidide, monuron, napropamide, napropanilide, nitralin, oxaciclomefone, phenisopham, piperophos, procyazine, profluralin, pyributicarb, secbumeton, sulfallate (CDEC), terbucarb, triaziflam, triazofenamid, trimeturon, among others;

d) Nematocides: Benomyl, cloethocarb, aldoxycarb, tirpate, diamidafos, fenamiphos, cadusafos, dichlofenthion, ethoprophos, fensulfothion, fosthiazate, heterophos, isamidofof, isazofos, phosphocarb, thionazin, imicyafos, mecarphon, acetoprole, benclothiaz, chloropicrin, dazomet, fluensulfone, 1,3-dichloropropene (telone), dimethyl disulfide, metam sodium, metam potassium, metam salt (all MITC generators), methyl bromide, steam fumigation of soil, allyl isothiocyanate (AITC), dimethyl sulfate, furfual (aldehyde), dentre outros.

The compositions shall be used as a wettable powder formulation. However, other formulations containing said micro-organisms, such as emulsions, microemulsions, suspensions, concentrated suspensions, granules, encapsulation, microencapsulation, nanoencapsulation, among others, also can be used.

The multifunction biological compositions shall act to biologically control phytopathogens, phytonematodes and plant pests, for use as inoculants, phosphorus solubilizers, soil conditioners, biostimulants, crop hydric stress reducers, and for bioremediating cultivable areas, or not, with nematocidal effects on the reduction of damages and control of phytonematodes including, but not limited to, *Pratylenchus brachyurus, Pratylenchus zea, Meloidogyne incognita, Meloidogyne javanica, Meloidogyne exigua, Heterodera glycines, Rotylenchulus reniformis, Pratylenchus coffea, Helicotilechus dihystera*, with fungicidal effects on the reduction of damages and control of, but not limited to, *Phakopsora pachvrhizi, Corynespora cassiicola, Puccinia polysora, Xanthomonas axonopodis, Rannilaria areola, Hemileia vastatrix, Cercospora coffeicola, Phoma* spp., *Pseudomonas syringae, Rhizoctonia solani, Fusarium solani, Fusarium oxysporum, Fusarium graminearum, Fusarium semitectum, Colletotrichum gloeosporioides, Colletotrichum truncatum, Colletotrichum lindemuthianum, Macrophomna phaseolina, Sclerotinia sclerotiorum, Botrytis cinerea, Penicillium digitatum*, with insecticidal action on the reduction of damages and control of, but not limited to pests such as *Polyphagotarsonemus latus, Tetranychus urticae, Diabrotica speciosa, Anticarsia gemmatalis, Spodoptera cosmioides, Spodoptera frugiperda, Pseudoplusia includens, Trichoplusia ni, Bemisia tabaci, Euschistos heros, Nezara viridula, Leucoptera coffeella, Hypothenemus hampei, Oligonychus ilicis, Polyphagotarsonemus latus, Brevipalpus phoenicis, Planococcus citri, Planococcus minor*, with a growth promoting action, soil conditioning, biostimulation, mitigation of crop hydric stress, and bioremediation in cultivable areas, or not, in addition to polymers/excipients in spray formulations, plantation furrow spraying, drench, coating (industrial or non-industrial), treatment (industrial or non-industrial) and incrustation (industrial or non-industrial) of crop seeds including, but not limited to *Coffea* spp (*Coffea arabica, Coffea canefora, Coffea robusta*), *Brachiaria* spp. (*Brachiaria brizantha, Brachiaria decumbens, Brachiaria humidicola, Brachiaria mutica, Brachiaria ruziziensis, Brachiaria arrecta, Brachiaria dictyneura*), *Panicum* spp. (*Panicum maximum*), *Sorghum* spp., *Pennisetum americanum, Glycine max, Zea mays, Gossypium hirsutum*, greenery (*Solanum lycopersicum, Allium cepa, Lactuca sativa, Daucus carota, Capsicum annuum* Group), forestry (*Eucalyptus* spp., *Tectona grandis, Hevea brasiliensis, Pinus* sp), *Nicotiana tabacum*, ornamental, fruit (*Citrus* spp., *Malus* spp., *Carica papaya, Vitis* spp., *Cucumis melo, Prunus persica, Passiflora edulis*), crotalarias (*Crotalaria juncea, Crotalaria spectabilis, Crotalaria ochroleuca, Crotalaria paulina, Crotalaria breviflora*), among others.

EXAMPLE OF OBTAINING GENUS AND/OR SPECIES OF ACTINOMYCETES AND MUTANTS THEREOF

For the sake of example, when obtaining at least 2 (two) genera and/or species of: Actinomycetes and mutants thereof; Actinomycetes mixed with *Bacillus* genus representatives; Actinomycetes mixed with fungi of Hypocreales, Orbiliales, Helotiales and Mucorales orders, and a combination among the whole or part thereof (in colony forming unities, c.f.u.), we have:

Example 1

*Streptomyces flavovirences*—1.0×10$^6$ c.f.u./g
*Nocardia erythropolis*—1.0×10$^6$ c.f.u./g

Example 2

*Streptomyces grisus*—1.0×10$^6$ c.f.u./g
*Bacillus licheniformis*—1.0×10$^{10}$ c.f.u./g
*Bacillus amyloliquenfacies*—1.0×10$^{10}$ c.f.u./g

Example 3

*Nocardia asteroides*—1.0×10$^6$ c.f.u./g
*Bacillus licheniformis*—1.0×10$^{10}$ c.f.u./g
*Trichoderma harzianum*—1.0×10$^7$ c.f.u./g
*Purpuriocillium lilacinus*—1.0×10$^9$ c.f.u./g

Example 4

*Streptomyces purpuracens:* 1.0×10$^6$ c.f.u./g
*Bacillus thuringiensis:* 1.0×10$^9$ c.f.u./g
*Beauveria bassiana:* 1.0×10$^8$ c.f.u./g By way of example, the composition may show the following concentrations:

Example 1

*Streptomyces flavovirences:* 1.0 to 20.0%
*Nocardia erythropolis:* 1.0 to 20.0%
Additives: 1.0 to 20.0%
Excipients: 97.0 to 40.0%

Example 2

*Streptomyces grisus:* 1.0 to 20.0%
*Bacillus licheniformis:* 1.0 to 20.0%
*Bacillus amyloliquefaciens:* 1.0 to 20.0%
Additives: 1.0 to 20.0%
Excipients: 91.0 to 10.0%
Azoxistrobin 5.0 a 10.0%

Example 3

*Nocardia asteroides:* 1.0 to 20.0%
*Bacillus licheniformis:* 1.0 to 15.0%
*Trichoderma harzianum:* 1.0 to 20.0%
*Purpuriocillium lilacinus:* 1.0 to 15.0%
Additives: 1.0 to 20.0%
Excipients: 95.0 a 10.0%

Example 4

*Streptomyces purpuracens:* 1.0 to 20.0%
*Bacillus thuringiensis:* 1.0 to 20.0%
*Beauveria bassiana:* 1.0 to 20.0%
Additives: 1.0 to 20.0%
Excipients: 96.0 a 20.0%

EXAMPLES OF OBTAINING THE COMPOSITION

A composition containing 20.0% (w/v) of *Streptomyces flavovirences*, 20.0% of *Nocardia erythropolis*, 3.0% of acrylic styrene polymer, 1.0% of anionic surfactant, and 56.0% of inert material was formulated in order to evaluate its efficiency in the control of phytonematodes, phytopathogens, and biostimulation.

A composition containing 20.0% of *Streptomyces grisus*, 7.0% of *Bacillus licheniformis*, 7% of *Bacillus amyloliquefaciens*, 3.0% of acrylic styrene polymer, 1.0% of anionic surfactant, 10.0% of azoxistrobin, and 52.0% of inert material was formulated in order to evaluate its efficiency in the control of phytopathogens, foliar and radicular growth stimulation, and hydric stress reduction.

A composition containing 20.0% of *Nocardia asteroides*, 7.0% of *Bacillus licheniformis*, 20.0% of *Trichoderma harzianum*, 10.0% of *Purpuriocillium lilacinus*, 3.0% of acrylic styrene polymer, 1.0% of anionic surfactant, and 39.0% of inert material was formulated in order to evaluate its efficiency in the control of phytopathogens, foliar and radicular growth stimulation, and hydric stress reduction.

A composition containing 20.0% of *Streptomyces purpuracens*, 7.0% of *Bacillus thuringiensis*, 20.0% of *Beauveria bassiana*, 3.0% of acrylic styrene polymer, 1.0% of anionic surfactant, and 49.0% of inert material was formulated in order to evaluate its efficiency in the control of insects.

The compositions for the biological control of phytopathogens, phytonematodes and insects, for use as inoculants, soil conditioners, biostimulants, for reducing plant hydric stress and for bioremediation shall follow the flow of events below:

Raw material: the raw material that will make out the product shall be received and handled by trained people;

Mixture: the raw material shall be weighed and mixed following the standard operational procedure (SOP) at the proportions indicated therein;

Sampling: after the mixing, samples shall be taken for the examination and product guarantee certification. The number of colony forming unities (c.fu.)/g product shall be evaluated;

Packing: the formulated product within the guarantee specifications shall be packed in previously labeled 1.0, 5.0 and 10.0 kg plastic vials. The vials/pouches are sealed and closed;

Storage: the vials/pouches are accommodated on pallets and stored in a dry aired light-protected place, and kept under said condition until being dispatched.

The present invention may be Applied either by bar spraying, plantation furrow spraying, drench, as a coating (industrial or non-industrial), treatment (industrial or non-industrial) and incrustation (industrial or non-industrial) of crop seeds for biologically controlling phytopathogens, phytonematodes and insects, for use as inoculants, soil conditioners, biostimulants and crop hydric stress reducers, and for bioremediation. The application method shall be analyzed case by case and will depend on the technical conditions and needs of every producer.

Advantages Attained

The use of the composition for biologically controlling phytopathogens, phytonematodes and insects, for use as an inoculant, as a soil conditioner, as a biostimulant and as a crop hydric stress reducer, and for bioremediation, containing mixtures of Actinomycetes or Actinomycetes mixed with bacteria and/or fungi, provide the following advantages:

It favors the development of cultivated plants, leading to increments in radicular, foliar growth and production parameters;

It is an alternative to the use of chemical fungicides, nematocides and insecticides, thus fulfilling the public interest in environmentally safer products;

It explores a larger range of mechanisms of action against phytonematodes, thus assuring a higher efficiency;

It explores a larger range of mechanisms of action against phytopathogens, thus assuring a higher efficiency;

It explores a larger range of mechanisms of action against insects, thus assuring a higher efficiency;

It explores a larger range of mechanisms of action for fixing nitrogen into plants, thus assuring a higher nutritional efficiency;

It explores a larger range of mechanisms to condition the soil, thus reducing phytopathogens and increasing the interaction with roots and promoting the radicular and foliar growth of cultivated plants;

It explores a larger range of mechanisms of action against abiotic stress, mainly hydric stress, thus assuring a higher efficiency in the retention of water and productive increment;

It explores different mechanisms of action in the degradation of environmentally harmful substances, such as pesticides;

It diminishes the selection of chemical resistant phytonematodes, phytopathogens and insects;

It is easy to operate when spraying technology, plantation furrow spraying, drench and coating, treatment and incrustation of seeds is used in the industry, or not;

It can be used in constituents used in the coating, treatment and incrustation of seeds (industrial or non-industrial) of *Coffea* spp (*Coffea arabica, Coffea canefora, Coffea robusta*), *Brachiaria* spp. (*Brachiaria brizantha, Brachiaria decumbens, Brachiaria humidicola, Brachiaria mutica, Brachiaria ruziziensis, Brachiaria arrecta, Brachiaria dictyneura*), *Panicum* spp. (*Panicum maximum*), *Sorghum* spp., *Pennisetum americanum, Glycine max, Zea mays, Gossypium hirsutum*, greenery (*Solanum lycopersicum, Allium cepa,*

*Lactuca sativa, Daucus carota, Capsicum annuum* Group), forestry (*Eucalyptus* spp., *Tectona grandis, Hevea brasiliensis, Pinus* sp), *Nicotiana tabacum*, ornamental, fruit (*Citrus* spp., *Malus* spp., *Carica papaya, Vitis* spp., *Cucumis melo, Prunus persica, Passiflora edulis*), crotalarias (*Crotalaria juncea, Crotalaria spectabilis, Crotalaria ochroleuca, Crotalaria paulina, Crotalaria breviflora*) in the industrial treatment, or not.

The scope of the present application should not be limited to the application examples, but to the terms defined in the claims and equivalents thereof.

BIBLIOGRAPHIC REFERENCES

Alami, Y. Achouak W, Marol C, Heulin T. Rhizosphere soil aggregation and plant growth promotion of sunflowers by an exopolysaccharide-producing *Rhizobium* sp. Strain isolated from sunflower roots. Applied and environmental microbiology, v. 66, n. 8, p. 3393-3398, 2000.

Aranjo, F. F. Inoculação de sementes com *Bacillus subtilis*, formulado com farinha de ostra e desenvolvimento de milho, soja e algodão. Ciências e Agrotecnologia, Lavras, v. 2, p. 456-462. 2008

Aranjo, J. M. Estrategias para isolamento seletivo de Actinomicetos. In: Melo, I. S. & Azevedo, J. L. Ecologia Microbiana. Jaguariúna: Embrapa, 1998. p. 327-347.

Arora, N. K.; Kang, S. C.; Maheshwari, D. K. Isolation of siderophore producing strains of *Rhizobium meliloti* and their biocontrol potential against *Macrophomina phaseolina* that causes charcoal rot of groundnut. Curr Sci, v. 81, n. 6, p. 673-677, 2001.

Arras G. & Arm S. Mechanism of action of some microbial antagonists against fungal pathogens. Annali diMicrobiologia ed Enzimologia 47:97-120. 1997.

Baker, C. J.; Stavely, J. R.; Thomas, C. A.; Sasser, M. & Macfall, J. S. Inhibitory effect of *Bacillus subtilis* on *Uromyces phaseoli* and on development of rust pustules on bean leaves *Phaseolus vulgaris*. Phytopathology, St. Paul, 73:1148-1152, 1983.

Bettiol, W.; Ghini, R.; Morandi, M. A. B.; Stadnik, M. J.; Kraus, U.; Stefanova, M.; Prado, A. M. C. 2008. Controle biológico de doencas de plantas na América Latina. In: Alves, S. B. & Lopes, R. B. (Eds.) Controle Microbiano de Pragas na América Latina—Avanços e desafios. Piracicaba. FEALQ. 2008. pp. 303-331.

Bird D. M.; Opperman, C. H.; Davies K. G. 2003. Interactions between bacteria and plant-parasitic nematodes: now and then. Int. J. Parasitol. 33:1269-1276.

Cook, R. J.; Baker, K. F. 1983. The nature and practice of biological control ofplant pathogens. St. Paul: APS, 1983. 539p.

Crawford, D. Isolation and characterization of actinmycete antagonists of a fungal root pathogen. Applied and environmetal microbiology, Washington, v. 59, n. 11, p. 3899-3905. 1993.

Da Silva, G. J.; Vieira, J. D.; Soares, L. F.; Barros J. F.; Mendes, S. P. S. C.; Geraldine, A. M. Chemical and biological control on *Pratylenchus brachyurus* godfrey in soybean crop management. 50° congresso Brasileiro de fitopatologia. 2007.

De Mattos, L. P. V. Controle de *Guignardia citricarpa* e *Penicillium digitatum* em laranja com óleos essenciais e agentes de biocontrole. Tese (doutorado)—Universidade Estadual Paulista, Faculdade de Ciencias Agronomicas, 2010.

Esposito, E.; Paulilo, S. M.; Manfio, G. P. Biodegradation of the herbicide diuron by indigenous actinomycetes. Chemsphere, New York, v. 37, p. 541-548, 1998.

Groth, I. Actinomycetes in Karstic caves of northern Spain (Altamira and Tito Bustillo). Journal of microbiological methods. Amsterdam, v. 36, p. 116-122, 1999.

Hallmann, J.; Faupel, A.; Krechel, A.; Sikora, R. A.; Berg, G. Endophytic bacteria and biological control of nematodes. Bulletin OILB/SROP. 27:83-94. 2004.

Hasky-Günther, K.; Hoffmann-Hergarten, S.; Sikora, R. A. Resistance against the potato cyst nematode Globodera pallida systemically induced by the rhizobacteria Agrobacterium radiobacter (G12) and Bacillus sphaericus (B43). Fund. Appl. Nematol. 21:511-517. 1998.

Heuer, H. Analysis of actinomycete communities by specific amplification of genes encoding 16S rRNA and gel-eletrophoretic separation in denaturing gradientes. Applied and environmental microbiology, Washington, v. 63, n. 8, p. 3233-3241, 1997.

Higaki, W. A. 2012. Bacillus subtilis e abamectina no controle de Rotylenchulus reniformis e Pratylenchus brachyurus e alterações fisiológicas em algodoeiro em condições controladas. Dissertação (Mestrado em Agronomia)—Universidade do Oeste Paulista—Unoeste: Presidente Prudente—SP.

Huang, T. & Chang, M. Studies on xanthobacidin, a new antibiotic from Bacillus subtilis active against Xanthomonas. Botanical Bulletin Academia Sinica 16:137-148. 1975.

Hussain, M. B. Zahir, A. Z.; Asghar, H. N.; Mubaraka, R.; Muhammad, N. Potential of Rhizobium spp. for improving growth and yield of rice (Oryza sativa L.). Soil Environ, v. 28, n. 1, p. 49-55, 2009.

Kennedy, A. C. Bacterial diversity in agroecosystems. Agriculture ecosystems & environment. Amsterdam, v. 74, p. 65-76, 1999.

Kumar, Sudhir; Stecher, Glen; Tamura, Koichiro. MEGA7: Molecular Evolutionary Genetics Analysis version 7.0 for bigger datasets. Molecular biology and evolution, p. msw054, 2016.

Motomura, M.; Hirooka, E. Y. Método rápido para o isolamento de microrganismos de solo com atividade antifúngica sobre Fusarium moniliforme. Arquivos de Biologia e Tecnologia, Curitiba, v. 39, n. 2, p. 313-322, 1996.

Padilha, G. Biologia molecular de Streptomyces e aplicações industriais. In: Melo, I. S. & Azevedo, J. L. Ecologia Microbiana. Jaguariúna: Embrapa, 1998. p. 327-347.

Pandhare, J.; Zog, K.; Deshpande, V. V. Deffereintial stabilities of alcaline protease inhibitors from actinomycetes: effect of varius additives on thermostability. Bioresource technology. Amsterdam, v. 84, p. 165-169, 2002.

Schrijver, A. & Mot, R. Degradation of pesticides by actinomycetes. Critical Reveiews in microbiologiy, Boca Raton, v. 25, p. 85-119, 1999.

Sikora, R. A & Hoffmann-Hergaten, S Importance of plant health-promoting rhizobacteria for the control of soil-borne fungal diseases and plant parasitic nematodes. Arab. J. Plant Prot. 10:48-53. 1992.

Sikora, R. A. & Padgham, J. L. Biological control potential and modes of action of Bacillus megaterium against Meloidogyne graminicola on rice. Crop Protection 26:971-977. 2007.

The invention claimed is:

1. A multifunctional biological composition comprising:
   (a) 1.0 to 20.0% w/v of a first microorganism being Streptomyces griseus;
   (b) 1.0 to 20.0% w/v of a second microorganism being Bacillus licheniformis;
   (c) 1.0 to 20.0% w/v of a third microorganism being Bacillus amyloliquefaciens;
   (d) 1.0 to 20.0% w/v of an additive selected from the group consisting of an acrylic styrene polymer and an anionic surfactant;
   (e) 10.0 to 91.0% w/v of an excipient being inert material; and
   (f) 5.0 to 10.0% w/v of a pesticide being azoxystrobin.

2. The composition according to claim 1, wherein said composition is formulated as a formulation selected from the group consisting of a wettable powder formulation, emulsions, microemulsions, suspensions, concentrated suspensions, granules, an encapsulation, a microencapsulation, orand a nanoencapsulation.

3. The composition according to claim 1, wherein said composition is capable of controlling phytopathogens, foliar and radicular growth stimulation, and hydric stress reduction.

4. A method for furrow spraying and drenching of cultivated plants comprising administering the composition according to claim 1 during furrow spraying and drenching of cultivated plants.

5. A method for coating, treating, and encrusting of industrial or non-industrial seeds comprising administering the composition according to claim 1 for coating, treating, and encrusting of industrial or non-industrial seeds.

6. A method for controlling phytopathogens comprising administering the composition according to claim 1 for controlling phytopathogens.

7. A method for controlling phytonematodes comprising administering the composition according to claim 1 for controlling phytonematodes.

8. A method for controlling plant pests comprising administering the composition according to claim 1 for controlling plant pests.

9. A method for enhancing the growth of cultivated plants comprising administrating the composition of claim 1 as a biostimulant, as an inoculant, as a phosphorus solubilizer, and as a growth stimulant for enhancing the growth of cultivated plants.

10. A method for conditioning a soil for the growth of cultivated plants comprising administering the composition according to claim 1 for the growth of cultivated plants.

11. A method for conditioning a soil for mitigating or reducing the hydric or abiotic stress in cultivated plants comprising administering the composition according to claim 1 for mitigating or reducing the hydric or abiotic stress in cultivated plants.

12. A method for bioremediating cultivable areas for reducing the contamination of the environment by toxic waste and non-toxic waste comprising administering the composition according to claim 1 for bioremediating cultivable areas for reducing the contamination of the environment by toxic waste and non-toxic waste.

* * * * *